United States Patent [19]

McNeely et al.

[11] 4,274,894

[45] Jun. 23, 1981

[54] ALUMINUM POWDER BLASTING SLURRY SENSITIZER

[75] Inventors: Wray G. McNeely; Stanton E. Jack; John H. O'Dette, all of Kingston, Canada

[73] Assignee: Alcan Research and Development Limited, Montreal, Canada

[21] Appl. No.: 915,720

[22] Filed: Jun. 15, 1978

[30] Foreign Application Priority Data

Jun. 24, 1977 [GB] United Kingdom .............. 26636/77

[51] Int. Cl.$^3$ ............................................. C06B 45/34
[52] U.S. Cl. .......................................... 149/7; 149/6
[58] Field of Search ....................................... 149/6, 7

[56] References Cited

U.S. PATENT DOCUMENTS

| | | | |
|---|---|---|---|
| 3,297,502 | 1/1967 | Chrisp | 149/6 |
| 3,367,805 | 2/1968 | Clay et al. | 149/6 |
| 3,373,062 | 3/1968 | Morris | 149/6 |
| 3,709,747 | 1/1973 | Nixon et al. | 149/6 |
| 3,781,177 | 12/1973 | Kondis et al. | 149/6 |
| 3,837,937 | 9/1974 | Fox et al. | 149/6 |
| 3,919,013 | 11/1975 | Fox et al. | 149/6 |
| 4,089,715 | 5/1978 | Scherzinger | 149/6 |

*Primary Examiner*—Edward A. Miller
*Attorney, Agent, or Firm*—Cooper, Dunham, Clark, Griffin & Moran

[57] ABSTRACT

Aluminum powder compositions, and methods for their preparation, comprising fine particle size aluminum powder, a polyvinylpyrrolidone resin in an amount of 5% to 20%, based on the aluminum, and either a hydrocarbon or a polar liquid medium in an amount of 30% to 50%, based on the aluminum, are described. These compositions find use as sensitizers in slurry-type blasting agents. Compared to known compositions, they are both dust free and substantially non-reactive, on storage, toward the aqueous milieu of such a slurry.

11 Claims, No Drawings

4,274,894

ALUMINUM POWDER BLASTING SLURRY SENSITIZER

BACKGROUND OF THE INVENTION

1. Field of the Invention

This invention relates to fine particle size aluminum powder compositions, and to processes for their manufacture. The compositions of this invention are particularly useful as sensitizers in the well-known aqueous slurry type blasting agents.

2. Description of the Prior Art

Fine particle size aluminum powders, wherein the particles are of sizes down to only a few microns, a size range of from about 2 microns to about 10 being typical, have a number of uses. For example, they are used in paints, printing inks and plastics as colorants. They are also used in aqueous slurry type blasting agents as sensitizers.

However, all uses of aluminum particulate materials which involve handling a particulate material containing at least a proportion of fine powder of the above-mentioned size range require that a major hazardous property of such fine powders be borne in mind: micron size aluminum powder is a highly reactive material which is prone to dust explosions. This very real and dangerous hazard has, and still does, place significant constraints upon the commercial use and handling of such powders. The risk is considerably higher if the operation in question both involves the presence of micron-size powder and requires the handling, at some stage, of dry powder.

These problems can be either mitigated sufficiently or even effectively avoided, in many uses by ensuring that the aluminum powder is always in what is called a "wetted down" condition: that is, it is coated at all times with an organic liquid with which the aluminum powder does not react. Generally the organic liquid used is a hydrocarbon, the most frequently used ones being mineral spirits or kerosene.

It is to be noted, that water generally cannot be used as the wetting-down liquid. The reason for this is that fine powder aluminum reacts even with cold water, to form hydrogen and a more, or less, hydrated aluminum oxide. The precise nature of the aluminum oxide product depends on the precise reaction conditions. Indeed this property is deliberately relied upon in some uses, for example in blowing concrete and cement systems to produce voids in them during the setting process.

Whilst these wetted-down pastes are less hazardous to handle from the explosion aspect, due to the elimination of free airborne dust, they are not a complete solution to the problem. There are two main reasons for their being not completely satisfactory.

The first is that one hazard has, to an extent, merely been replaced by another: the dust explosion hazard has been overcome at the expense of creating a flammability hazard due to the hydrocarbon liquid. Whilst this flammability too can be mitigated by a careful choice of the hydrocarbon it cannot be totally eliminated. It should also be borne in mind that should a fire result then the presence of the aluminum powder exacerbates the problems since it too, will join in the conflagration.

The second is that in many systems the presence of the hydrocarbon used to wet-down the aluminum powder cannot be tolerated, or at best only tolerated to a limited extent. It usually cannot be tolerated due to the difficulties its presence causes when the wetted-down powder is put to its intended end-use. This difficulty is frequently acute in water-containing systems, especially those containing little, or no, other organic solvents. Further, the dispersal of the hydrocarbon into such an aqueous system by the use of surface active agents is not always a complete cure to the problems. Representative aqueous systems in which only limited amounts of hydrocarbons can be tolerated are concrete and cement foaming systems, and slurry blasting agents. In both cases a safe and easily handleable powder composition which will disperse into water is desirable. Of these two types, slurry blasting agents are perhaps the more tolerant of hydrocarbons.

But aqueous slurry type blasting agents also impose limitations on the aluminum powder which, to an extent, are virtually incompatible and one of which constitutes a severe disadvantage in a cement or concrete foaming system. On the one hand the powders are required to be sufficiently chemically reactive to play an effective part in the explosion processes. But on the other hand the powders are required to be sufficiently chemically unreactive toward water. The reason for the first of these mutually opposing criteria is obvious: a sensitizer that does not work is no use. The second arises for reasons that are not so obvious. If in the aqueous ammonium nitrate-based systems commonly used in slurry-type blasting agents any aluminum powder used as sensitizing reagent reacts with the water in the system then some, or all, of three major consequences follow. First, all of the sensitizer could get consumed, resulting in a blasting agent which will not fire. The dangers that can thereafter follow need no comment. Second, consumption of only part of the sensitizer can have two results: the formation of hydrogen gas bubbles and the coating of the sensitizer particles with a layer of some sort of hydrated oxide. These gas bubbles again cause hazards: in an extreme case they can result in a slurry either going "dead" and not exploding at all, or in a less extreme case severely inhibit the explosion processes. Either way, the blasting agent does not function properly. The generation of an oxidic coating on the particles is also deleterious to blasting agent performance: It is known from studies of air-blown particulate aluminum used as a fuel in slurry-type blasting agents that particles having a heavily oxidised surface do not work at all well. But the third reason is a more practical one. In a mine a bore hole is not necessarily blown immediately after filling with blasting agent. The delay can be hours or even days. A mine operator therefore requires a system which can accomodate such a delay: clearly a system in which the aluminum sensitizer powder reacts cannot accomodate much delay between charging the bore hole and firing it.

But nevertheless against all of these disadvantages must be set the fact that industrially the most convenient procedure for preparing fine particle size aluminum is to grind it, commonly in a ball-mill, and in a hydrocarbon solvent, such as mineral spirits or kerosene. It therefore follows that it is desirable to develop procedures whereby a safe to handle powder that does not, especially, present dust explosion problems, can be obtained.

It has been proposed to overcome these dust hazards for such powders when dry, and with blasting agent use in mind, by coating the aluminum powder. In one procedure the aluminum dust is coated with a polyfluoroethylene material, such as Teflon-K (Trade Mark) by tumbling the dry aluminum powder with the polymer at a temperature of about 100° C. It can immediately be seen that this method involves handling a dry aluminum powder. This technique is, however, successful in that it will effectively de-dust powder material such as vacuum dried aluminum flake. But this process also has two further disadvantages. First, the polyfluoroethylene polymer materials are relatively expensive. In a blasting agent context its second disadvantage is far more important: these polyfluorethylene coatings markedly reduce the effectiveness of aluminum powders as sensitizing agents. It can become necessary to use up to 30% more de-dusted aluminum carrying such a polyfluoroethylene coating in order to achieve the same effect as the un-coated material in a slurry-type blasting agent.

In an alternative procedure it is proposed to grind, for example in a ball mill, blown aluminum powder in the absence of water and in the presence of stearic acid and a hydrocarbon medium. The hydrocarbon is commonly mineral spirits or kerosene. The product is then separated from the hydrocarbon by filtering and vacuum drying. Such a process is not completely satisfactory. First and foremost the product still contains some dust and therefore the handling hazard is only decreased, not eliminated. Second, these powders have been found on occasions to gas, that is, to react with the water in the blasting agent slurry. The undesirability of this has been discussed above. But third their performance is severely impaired if any hydrocarbon remains on the powder: it is frequently the case that such impairment is also only discovered when a charged borehole either fails to explode, or does not blow properly. Again these hazards have been discussed above.

Thus neither of these procedures provide a product that is commercially attractive for field use in a slurry-type blasting agent.

SUMMARY OF THE INVENTION

This invention seeks to overcome all of these problems and to provide an aluminum powder that is both dust-free, non-reactive with water, and also an efficient slurry-type blasting agent sensitizer and which, if desired, can be completely freed of hydrocarbons.

It has now been discovered that a fine particle size aluminum powder composition can be prepared which meets these desiderata by grinding a particulate aluminum feed material in a hydrocarbon medium and in the presence of a polyvinylpyrrolidone resin. It has also been discovered that in such a system the hydrocarbon may be replaced by a polar solvent such as water or formamide by a comparatively simple procedure.

Thus in a first aspect this invention provides a substantially non-dusting fine particle size water-dispersable aluminum powder composition containing, based on the weight of aluminum powder taken, from 5% to 20% by weight of a polyvinylpyrrolidone resin and from 30% to 50% of a liquid medium chosen from either a hydrocarbon or a polar solvent capable of swelling or dissolving the polyvinyl pyrrolidone resin.

In a second aspect this invention provides a process for the preparation of a substantially non-dusting fine particle size water-dispersable aluminum powder composition which comprises: (a) comminuting a particulate aluminum feed in a hydrocarbon medium and in the presence of from 5% to 20% by weight, based on the weight of aluminum particulate feed taken, of a polyvinylpyrrolidone resin powder until a desired aluminum particle size is reached and thereafter removing the majority of the hydrocarbon medium to provide a composition containing from about 30% to about 50% by weight based on the weight of aluminum present of hydrocarbon; and (b) thereafter if desired displacing the remaining hydrocarbon medium from the composition by blending therewith from 30% to 50% by weight, based on the weight of aluminum powder, of a polar solvent capable of swelling or dissolving polyvinyl pyrrolidone, and thereafter separating from the composition the displaced hydrocarbon medium.

Hence for every 100 parts by weight of aluminum in the compositions produced by the process of this invention in its broadest aspects there is from 5 to 20 parts by weight of polyvinylpyrrolidone resin and from 30 to 50 parts by weight of liquid medium.

DESCRIPTION OF THE PREFERRED EMBODIMENTS

Suitable hydrocarbons for use in both the compositions and the first stage of the process are mineral spirits, kerosene, paraffin or the like. The preferred hydrocarbon is kerosene, due to its higher flash point. Preferably the product obtained at the end of the first stage of the process contains, based on the weight of aluminum present, from 30% to 40% of hydrocarbon medium.

Preferably the compositions contain from 10% to 15% by weight of the weight of aluminum powder of polyvinylpyrrolidone resin.

The size of the aluminum powder obtained in the composition is of some importance. Typically it is such that 90% thereof by weight will pass a 325 mesh Tyler series seive. Thus a preferred size range for at least 90% of the particles is from about 2 microns to about 10 microns.

The aluminum metal material taken to prepare the powder can be almost any suitably small particulate aluminum feed. Thus air-blown powder, chopped foil, and comminuted scrap from various fabrication procedures, for example can making, can all be used. Further, both relatively pure aluminum and aluminum alloy feed stock material can be successfully used. However it is desirable, when alloy material is to be used, to avoid a feed stock which contains significant amounts of elements which may impair the properties of the produced composition when used in a slurry-type blasting agent. For example, it has been shown that significant amounts of copper and zinc have been found to impair the detonation velocity when particles containing Al-Cu and Al-Zn alloys are used as a fuel in an ammonium nitrate-fuel oil slurry blasting agent.

In preparing the compositions of this invention any suitable means of comminution which will give a powder of the requisite particle size can be used. A simple ball-mill is eminently satisfactory as also are commercially available more sophisticated mills such as the Szegavari Attritor.

So far as we can ascertain, any of the commercially available polyvinyl pyrrolidone resins can be used in this invention.

For many purposes, a hydrocarbon-free composition is desirable. As is indicated above, one feature of this invention is the provision of a wetted-down hydrocarbon-free composition. Such hydrocarbon-free systems are preferred when the compositions of this invention are used as slurry-type blasting agent sensitizers. The aluminum compositions can be freed of hydrocarbon to provide a composition containing a polar solvent by several procedures.

In essence the procedure is simply to displace the hydrocarbon by addition of a polar solvent which will dissolve or swell polyvinylpyrrolidone resin.

Thus a composition containing water can be obtained by kneading a composition containing hydrocarbon with the requisite amount of water, and then separating away the displaced hydrocarbon. Frequently simple decantation is sufficient when an aqueous paste is being prepared.

Alternatively a resin gel-like system containing the aluminum powder can be obtained by using a polar organic solvent. The preferred organic solvents are ethanol, ethylene glycol, diethylene glycol, or formamide. The solvent is added in an amount of from about 30% to about 50%, the lower end of this range, that is around 30% being preferred. The amount added is, again, based on the weight of aluminum in the composition. The solvent appears to swell the polyvinylpyrrolidone resin, which then runs together to form a gel-like system entrapping therein the aluminum powder. This forms a phase separate to the hydrocarbon, which can then be separated.

In both cases, these hydrocarbon-free compositions disperse in water to provide a dispersion of very fine aluminum particles.

As is noted above, in producing such hydrocarbon-free compositions, the hydrocarbon can often be removed by simple decantation. In practice it is found that, especially with the organic polar solvents, such a simple decantation still leaves significant quantities of hydrocarbon behind. This can result in an impaired sensitizer performance in a slurry-type blasting agent. If complete removal of the hydrocarbon is found necessary, then this can easily be achieved by any of the standard methods of separating a solid and a liquid. One which we have found to be successful is to squeeze the paste in a tube with a comparatively loosely fitting piston to provide a cake. The hydrocarbon escapes past the piston and can then be easily removed. Squeezing the paste to a cake in this fashion appears to have no effects on its dispersability into water. But there are many others that can be used: for example compression against a porous plate through which the hydrocarbon would escape, and a conventional filter-press are others. The underlying parameter that needs to be borne in mind is that the level of separation of the hydrocarbon from the paste shall be such that insufficient hydrocarbon remains for it to interfere with the end-use in mind.

The aluminum compositions of this invention are particularly suitable for use in aqueous slurry blasting agents, as either a hydrocarbon containing composition, or a hydrocarbon-free composition. As these latter are easier to disperse, they are preferred. They also exhibit the two most desirable properties required in a slurry-type blasting agent: they perform adequately as a sensitizer and appear to be inactive toward the aqueous milieu in which they are used. A typical ammonium nitrate slurry-type blasting agent in which these compositions have been tested is as follows, the quantities given being in parts by weight:

| ammonium nitrate | 43 | sulphur | 3 |
|---|---|---|---|
| sodium nitrate | 16 | sodium tartrate | 0.02 |
| water | 19 | sodium dichromate | 0.06 |
| surfactant | 2.5 | gums (if desired) | 1.0 (approx.) |
| aluminum powder sensitizer | 7 | solvent | 9 10 |

As the solvent, ethylene glycol, diethyleneglycol, and formamide have been found to be fully interchangeable. At this level they appear to have no effect on the blasting agent properties. Tests have shown such a system will fire properly over a temperature range of 0° C. to at least 19° C., and in bore hole size ranges from 3" to at least 9". (that is, 7.5 cm to about 23 cm).

These sensitizers also exhibit, as was noted above, a quite remarkable degree of stability. Tests with prepackaged slurry-type blasting agents have indicated no more than minimal gassing when stored for periods of up to three weeks. This level of stability is more than sufficient for field use, wherein prepackaging of the slurries is not generally practiced, for safety reasons.

We claim:

1. A substantially non-dusting fine particle size water-dispersable aluminum powder composition containing, based on the weight of aluminum powder present, from 5% to 20% by weight of a polyvinylpyrrolidone resin and from 30% to 50% of a liquid medium chosen from either a hydrocarbon or a polar solvent capable of swelling or dissolving the polyvinylpyrrolidone resin.

2. A substantially non-dusting fine particle size water-dispersable aluminum powder composition according to claim 1 containing, based on the weight of aluminum present, from 5% to 20% by weight of a polyvinylpyrrolidone resin and from 30% to 50% of a liquid hydrocarbon medium.

3. A substantially non-dusting fine particle size water-dispersable aluminum powder composition according to claim 1 containing, based on the weight of aluminum present, from 5% to 20% by weight of a polyvinylpyrrolidone resin and from 30% to 50% of a polar solvent capable of swelling or dissolving the polyvinyl pyrrolidone resin.

4. A composition according to claim 1, 2, or 3 containing, based on the weight of aluminum powder present, from 10% to 15% of a polyvinylpyrrolidone resin.

5. A composition according to claim 1, 2, or 3 wherein at least 90% of the aluminum powder present passes a 325 mesh Tyler seive.

6. A composition according to claim 1, 2, or 3 wherein at least 90% of the aluminum powder present has a size range of from about 2 microns to about 10 microns.

7. A composition according to claim 1 or 2 wherein the hydrocarbon is mineral spirits or kerosene.

8. A composition according to claim 1 or 2 containing, based on the weight of aluminum present, from about 30% to about 40% of hydrocarbon.

9. A composition according to claim 1 or 3 wherein the polar solvent is chosen from the group consisting of water, ethanol, ethylene glycol, diethylene glycol, and formamide.

10. A composition according to claim 1 or 3 containing, based on the weight of aluminum present, about 30% of polar solvent.

11. A composition according to claim 1 or 3 wherein the polar solvent is chosen from the group consisting of ethyleneglycol, diethylene glycol, and formamide.

* * * * *